Patented June 13, 1939

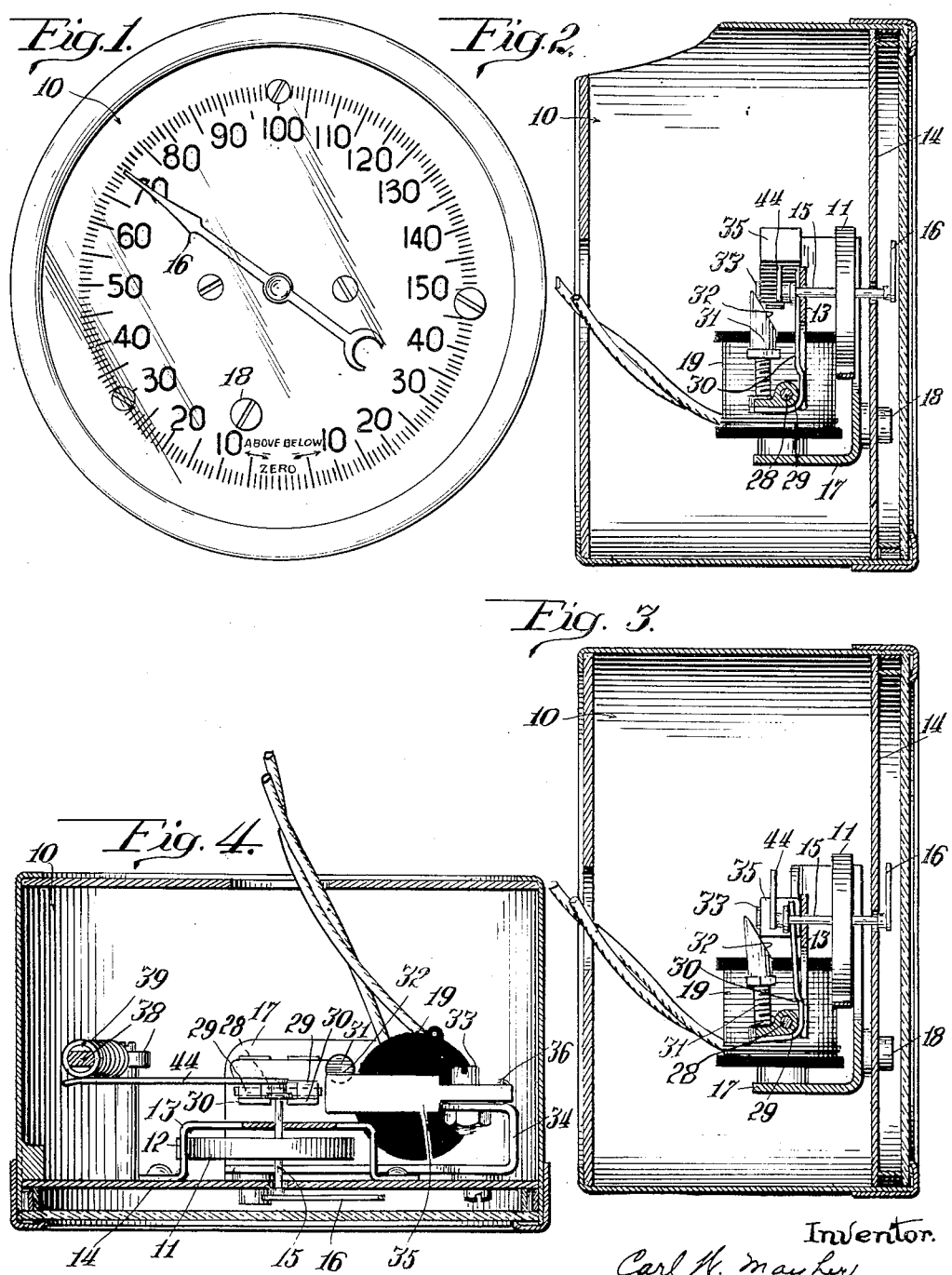

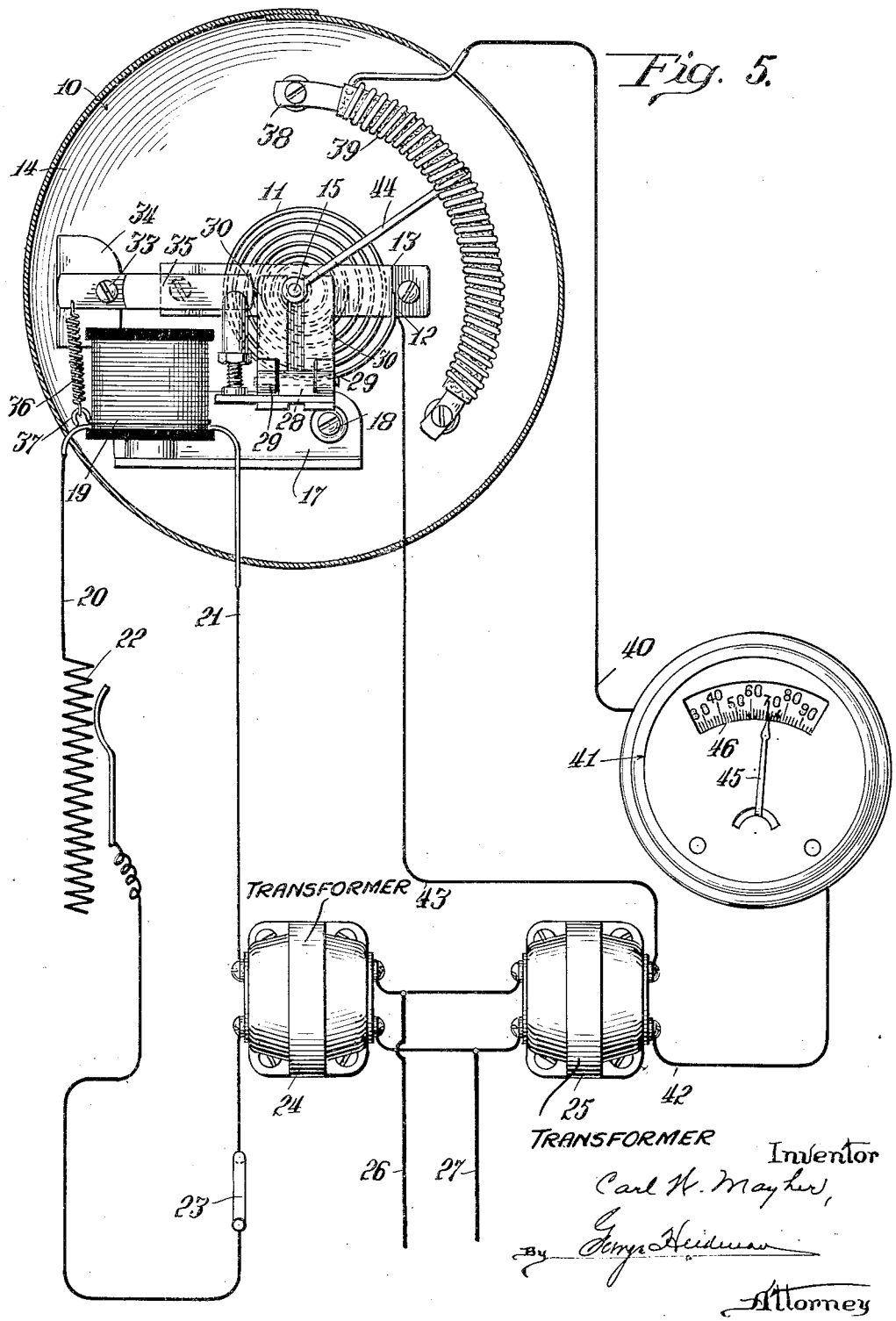

2,161,879

UNITED STATES PATENT OFFICE 2,161,879

TEMPERATURE INDICATING MECHANISM

Carl W. Mayher, Chicago, Ill.

Application May 6, 1935, Serial No. 20,057

1 Claim. (Cl. 201—48)

My invention relates to means whereby the temperature reading of a suitable thermometer at some remote pre-selected point or zone may be ascertained and indicated at the will of the operator through the medium of a controllable electric circuit.

The invention also has for an object the provision of comparatively simple mechanisms and arrangements whereby an indication of the temperature on some suitable calibrated instrument may be obtained; and the objects of the invention and its advantages will be more fully comprehended from the following detailed description of the accompanying drawings, wherein:

Figure 1 is a front elevation of the temperature indicating thermometer portion of the mechanism.

Figure 2 is a vertical sectional view of the thermometer portion shown in Figure 1, showing the mechanism in normal position.

Figure 3 is a similar view showing the mechanism in actuated position.

Figure 4 is a horizontal sectional view taken substantially through the center of the thermometer portion.

Figure 5 is a diagrammatic view of the mechanism, with the rear of the casing of the thermometer portion removed to show the internal construction.

The specific embodiment of the invention as disclosed in the drawings involves a temperature indicator or thermometer, generally indicated at 10, and involving a well known type of metallic coil 11 consisting of a sensitive temperature affected metal wound in loose turns something like a clock spring, with one end secured at 12 to a suitable supporting frame 13 properly secured on the rear surface of the dial 14, while the inner end of the coil 11 is fixedly secured to the spindle 15 of the indicator or pointer 16, so that as the turns of the coil 11 move the pointer or hand 16 will likewise move. That is to say, as the temperature rises the coil expands and the inner end thereof moves the pointer or hand 16 in clockwise direction in Figure 1 to indicate the higher temperature; while a drop in temperature causes the coil to move in winding direction and induces the pointer to move in counter-clockwise direction to indicate a lower temperature. This is a well known type of metallic thermometer and in itself constitutes no part of my invention except as a part of my entire mechanism and as supplemented by the mechanism now to be described.

The object of my invention is to provide mechanism whereby the temperature indicated by the metallic thermometer may be ascertained at a point in the building far removed from the room in which the thermometer is located; as for example, the engineer in the furnace room may, upon closing a switch, ascertain what the temperature reading on the top floor is.

The interior of the thermometer casing is provided with a suitable supporting frame or bracket 17 which may be secured against the rear side of the graduation carrying dial 14 by means of a screw as at 18. The bracket 17 supports a suitable magnet coil 19 arranged in a circuit involving lines 20 and 21; the line 20 being shown provided with an adjustable resistance indicated at 22 whereby the current for the magnet coil 19 may be reduced so as to avoid improper vibration in the indicating mechanism to enable proper indication by the means hereinafter described. The line 20 beyond the resistance 22 connects with a push button or suitable switch 23 and with a suitable transformer 24. Line 21 leads from the magnet coil 19 to the transformer 24 which is shown arranged in parallel with another transformer 25 which transformers are connected with the current supply lines 26, 27. Pivotally mounted at 28, by means of bracket arms 29, 29 are a pair of vertically disposed oscillatingly arranged arms 30 disposed on each side of the spindle 15 and adapted to have operative relation with the spindle 15 to which one end of the metallic coil 11 is secured. The lower pivoted ends of arms 30 have a lateral extension arranged on the opposite side of the pivot 28 which is provided with an upstanding post 31 whose upper end is shown with a sloping or tapered side face at 32.

Pivotally mounted at 33 on a suitable bracket 34, secured on the rear of the dial 14 is a vertically swinging armature 35 which is adapted to engage the beveled face 32 of the upstanding and tiltably mounted post 31. The short end of the armature 35 on the opposite side of the pivot 33 is shown provided with a spring 36 (see Figure 5) whose opposite end is shown attached to hook 37 at the lower end of the magnet coil so as to exert a downward pull on the short arm of the armature and consequently exert an upward or raising pull on the armature 35 and thereby hold the latter out of operative relation with the beveled face of the post 31. The armature 35 is arranged in close relation with the core of the magnet coil so that when the latter is energized the armature 35 will be attracted and rocked downwardly about its pivot point 33.

Mounted on suitable posts on the rear of dial 14 is a suitable resistance composed of a brass core 38 curved to define the arc of a circle concentric with spindle 15; the brass core 38 being covered with a suitable insulation, around which is wound a suitable resistance wire 39, which is wound as shown in Figure 5 with the respective turns spaced equal distances apart and arranged to represent a resistance degree; the resistance ranging from maximum at one end down to zero at the other end.

One end of this coiled wire 39 is secured to line 40 which connects with a terminal post on the rear of the secondary temperature indicator 41, while the other terminal of the indicator 41 is connected by a line 42 with transformer 25. This transformer 25 is also connected by line 43 with metallic frame 13 which supports the metallic spindle 15.

Fixedly secured to spindle 15 is a metallic arm or copper finger 44 whose free end extends alongside of the resistance coil 39 as shown in Figure 5. That is to say, the finger 44 extends between the resistance coil 39 and the disc 14, and normally in spaced relation with the resistance coil 39; and as finger 44 is fixedly secured to the spindle 15 it will oscillate through the arc of a circle in keeping with similar movements of the temperature indicating pointer 16 whose movements are controlled by the temperature responsive coil 11. As the outer end of coil 11 is secured to the bracket 13 and the inner end to the spindle 15, the coil 11 also tends to act as a spring, holding the pointer 16 in spaced relation with the forward face of dial 14 and finger 44 in spaced relation with resistance coil 39.

When magnet coil 19 is energized, armature 35 is drawn downwardly against the action of its spring 36. This downward movement of the armature causes post 31 to be moved toward one side, thereby oscillating the arms 30 about pivot 28; the arms 30 in turn sliding spindle 15 rearwardly against the action of coil 11 and causing finger 44 to contact with the resistance 39. Contact of finger 44 with resistance wire 39 closes the circuit from one terminal post of indicator 41, through transformer 25, wire 43, bracket 13, spindle 15, finger 44, resistance coil 39 and wire 40 connected to the other terminal post of indicator 41 and hence places the latter in electrically operative condition.

Indicator 41 is a well known type of voltmeter and hence requires no illustration and description of interior construction; the only change being in providing the dial with graduations in keeping with the graduations of the thermometer 10, indicating degrees of temperature and reading upwardly from left to right or in clockwise direction; the reading being indicated by the usual sensitively pivoted pointer 45, which normally points to the extreme left of the scale or graduations shown at 46; it being understood that indicator 41 has no thermo-responsive element and hence, except when the electric circuit is completed, will not give the temperature and therefor indicator 45 will remain inactive and point to the extreme left. The extent to which the pointer 45 will move from its normal position will be controlled by the degree of resistance offered by resistance coil 39 in the circuit which involves indicator 41; and the degree of resistance is controlled by the position of finger 44, namely the number of turns of resistance coil 39 between the finger 44 and the indicator 41. The winding or turns of resistance wire 39, as previously stated, are in a prearranged manner and correlated to the temperature indicating degrees of the thermometer 10, with the result that when the thermometer reading is 70 degrees as shown in Figure 1, the indicator 41 will likewise show 70 when its circuit is closed, as in the case in Figure 5.

I have shown and described what I believe to be a simple and effective embodiment of my invention which, for purposes of exemplification, has merely been shown in connection with a single thermometer, and has been described in terms employed merely as terms of description and not as terms of limitation, as modifications may be made without departing from the spirit of my invention.

What I claim is:

In mechanism of the character described, the combination of a rotatable and slidably mounted spindle, a temperature responsive coil disposed about the spindle with one end fixedly secured while the other end is secured to said spindle whereby the latter is rotated by the contracting and expanding movements of said coil induced by changes in the temperature, said coil yieldingly holding said spindle against sliding movement, a conductor finger fixedly secured to the inner end of said spindle so as to move therewith, a resistance coil arranged in an electric circuit and disposed adjacent the path of the free end of said finger whereby said circuit is closed when said finger engages said resistance coil, a tiltably mounted arm arranged in operative relation with said spindle and adapted to slide said spindle inwardly and thereby move the finger carried by the spindle into contact with the resistance coil, an electro-magnet arranged in a normally open electric circuit, a spring controlled tiltable armature adapted to tilt against the action of its spring when said electro-magnet is energized, a post secured to said arm and provided with a beveled face arranged adjacent the path of said armature so as to be tilted laterally when the tiltable armature is attracted by said electro-magnet thereby causing said arm to tilt, said spindle to be slid inwardly and the finger mounted on the spindle to be forced into contact with the resistance coil.

CARL W. MAYHER.